US005105439A

United States Patent [19]

Bennett et al.

[11] Patent Number: 5,105,439

[45] Date of Patent: Apr. 14, 1992

[54] DELAY EQUALIZATION DETECTOR

[75] Inventors: Richard L. Bennett, Schaumburg, Ill.; Venkat Narayanan, Boca Raton, Fla.

[73] Assignee: Motorola, Inc., Schaumburg, Ill.

[21] Appl. No.: 392,689

[22] Filed: Aug. 11, 1989

[51] Int. Cl.[5] ........ H04B 3/46

[52] U.S. Cl. ........ 375/10; 375/110; 333/18; 455/51.2

[58] Field of Search ........ 375/10, 11, 106, 107, 375/113; 333/18, 28 R; 455/51

[56] References Cited

U.S. PATENT DOCUMENTS

| | | | |
|---|---|---|---|
| 4,001,690 | 1/1977 | Mack et al. | 375/107 |
| 4,255,814 | 3/1981 | Osborn | 455/53 |
| 4,494,211 | 1/1985 | Schwartz | 375/107 |
| 4,651,330 | 3/1987 | Ballance | 375/107 |
| 4,696,051 | 9/1987 | Breeden | 455/51 |
| 4,718,109 | 1/1988 | Breeden et al. | 375/107 |
| 4,800,560 | 1/1989 | Aoki et al. | 370/104.1 |
| 4,807,259 | 2/1989 | Yamanaka et al. | 375/106 |

*Primary Examiner*—Benedict V. Safourek

*Assistant Examiner*—Young Tse

*Attorney, Agent, or Firm*—Wayne J. Egan

[57] ABSTRACT

An improved method for detecting that a facility delay has changed is provided. According to the invention, a facility having a delay that may change is coupled to a transmitter and a receiver. The transmitter is coupled to a first clock that transmits a first signal based on its current reading (the first clock signal) from time to time to the receiver via the facility. The receiver is coupled to a second clock that generates a second signal based on its current reading (the second clock signal) responsive to receiving the first clock signal. In operation, the first clock signal is fed downstream (via the facility having the delay), thereby triggering the second clock signal. The two clock signals are then detected and the difference in the two clock readings computed, thereby forming $\Delta_n$. The process is then repeated for successive first and second clock signals, thereby forming $\Delta_{n+1}$. The absolute value of $\Delta_n - \Delta_{n+a}$ is then compared with a predetermined value to determine whether the facility time delay has changed. This method is particularly useful in simulcast broadcast systems.

11 Claims, 2 Drawing Sheets

DELAY EQUALIZATION DETECTOR

TECHNICAL FIELD

This invention relates generally to simulcast radio communication systems and more particularly to a method to detect the change in the delay of a facility.

BACKGROUND OF THE INVENTION

Simulcast radio communication systems are typically employed to provide wide area one-way or two-way radio communication services. In such a system, a source site typically originates (or forwards from another originating site) a signal to be generally broadcast. This signal is routed from the source site to a plurality of remote sites. Each remote site then simultaneously broadcasts the signal in coordination with other remote sites to facilitate reception of the signal by receivers within the area covered by the system.

In this way, a receiver outside the operating range of one remote site may still be within range of one or more other remote sites, thereby reasonably ensuring that the receiver can receive the signal.

One problem with such simulcast systems involves coordinating the various remote sites to ensure that the signals are in fact substantially simultaneously broadcast by each. A failure to achieve this goal will likely result in instances of unacceptable reception coherence, usually caused by carrier frequency differences between the remote sites, deviation control differences, phase differentials with respect to the modulation signal, and the like.

One approach in the past to achieve quasi-synchronous transmission has been to automatically measure and adjust the delay on the distribution path to the individual transmitters. This approach has involved measuring the distribution path delay periodically, and from time to time compensating for the changing delay in each path. It will be appreciated that the delay in each path is due to many sources, including aging and environmental effects. In many cases, particularly dedicated telephone line distribution systems, the distribution path may be changed by telephone company switching equipment, resulting in an immediate and abrupt change in the facility delay. Such a delay change can seriously effect the reception in "non-capture" areas in the system until the change in the facility delay can be detected, measured, and compensated. Moreover, the delay measurement and adjustment procedure itself takes valuable facility time that otherwise would be available for customer traffic. For this reason, it is very desirable to increase the time period between successive facility measurement and adjustments to as long as possible. It would therefore be advantageous to provide an improved method detect a change in the delay of a facility.

SUMMARY OF THE INVENTION

It is an object of the invention, therefore, to provide an improved method for detecting that a facility delay has changed. According to the invention, a facility having a delay that may change is coupled to a transmitter and a receiver. The transmitter is coupled to a first clock that transmits a first signal based on its current reading (the first clock signal) from time to time to the receiver via the facility. The receiver is coupled to a second clock that generates a second signal based on its current reading (the second clock signal) responsive to receiving the first clock signal. In operation, the first clock signal is fed downstream (via the facility having the delay), thereby triggering the second clock signal. The two clock signals are then detected and the difference in the respective first and second clock readings computed, thereby forming $\Delta_n$. The process is then repeated for successive first clock and second clock signals, thereby forming $\Delta_{n+1}$. The absolute value of $\Delta_n - \Delta_{n+1}$ is then compared with a predetermined value (K) to determine whether the facility time delay has changed.

Detailed Description

Figure 1:
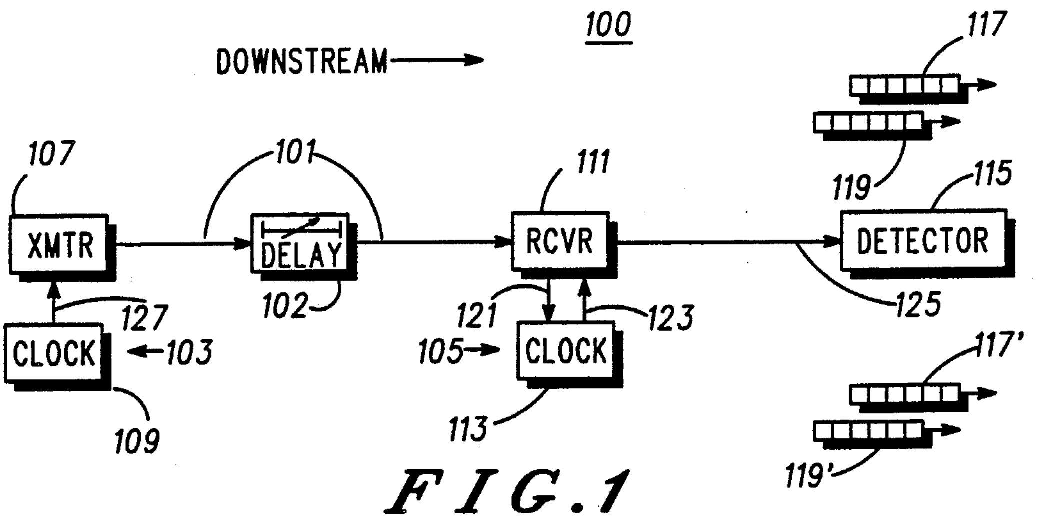
FIG. 1 is a block diagram showing a first embodiment of the delay equalization detector, according to the invention.

FIG. 1 is a block diagram showing a first embodiment 100 of the delay equalization detector, according to the invention. Here facility 101 is equipped with a delay that may change 102. Facility 101 is arranged to link two sites, an upstream site 103 and a downstream site 105. It will be appreciated that each site is defined only with respect to its respective end of facility 101 and, in fact, the two sites 103 and 105 may be located wholly within the same physical location.

Facility 101 is coupled to transmitter 107. Transmitter 107 is also coupled to a first clock 109. It will be appreciated that the first clock 109 has a finite $drift_1$ and $stability_1$. Facility 101 is also coupled to receiver 111. Receiver 111 is coupled to a second clock 113. It will be appreciated that the second clock 113 has a finite $drift_2$ and $stability_2$. The receiver 111 and the second clock 113 are also coupled to a detector 115 via a channel 125.

In operation, the clock 109 is arranged to generate its current time reading 127 from time to time. Assume that clock 109 generates its reading at time $t_1$. Transmitter 107 then sends a transmitter signal that includes the reading of clock 109 downstream towards the receiver 111 via facility 101 and towards the detector 115 via channel 125. It will be appreciated that the time required to transport this signal to the downstream site 105 is related to the then-current value of the facility delay 102. It is assumed the initial value of facility delay 102 is $delay_1$. Upon arrival of the transmitter signal (including the reading of clock 109) at the receiver 111, the receiver 111 causes, via enabling path 121, the clock 113 to generate its then-current reading 123. The receiver 111 then sends a receiver signal that includes the reading of clock 113 downstream towards the detector 115 via channel 125. The transmitter signal including the reading of clock 109, depicted as element 117, and the receiver signal including the reading of clock 113, depicted as element 119, are detected by detector 115. The detector 115 then computes the difference between the reading of clock 109 and the reading of clock 113. This difference is defined as $\Delta_1$.

Some time later (assume, for example, at time $t_2$) the foregoing process is repeated. The clock 109 again generates its current time reading 127. It will be appreciated that the value of this later reading of clock 109 will be different from the earlier reading of clock 109, as discussed above. The transmitter 107 then sends a transmitter signal that includes the reading of clock 109 downstream to the receiver 111 via the transmitter 107 and the facility 101 and towards the detector 115 via channel 125. It will be appreciated that the time required to transport this signal including the reading of clock 109 to the downstream site 105 is related to the then-current value of the facility delay 102. It is assumed the value of facility delay 102 at this time is $delay_2$. It will be appreciated that the facility delay 102 may or may not have changed subsequent to the transmission of the earlier transmitter signal including the earlier reading of clock 109. Thus, $delay_2$ may or may not equal $delay_1$. Upon receipt of the later transmitter signal including the later reading of clock 109 at the receiver 111, the receiver 111 again causes, via enabling path 121, clock 113 to generate its then-current reading 123. It will be appreciated that the value of this later reading of clock 113 will be different from the earlier reading of clock 113, as discussed above. The receiver 111 then sends a receiver signal that includes the later reading of clock 113 downstream towards the detector 115 via channel 125. Similar to before, the later transmitter signal including the later reading of clock 109, depicted as element 117', and the later receiver signal including the later reading of clock 113, depicted as element 119', are detected by detector 115. The detector 115 then computes the new difference between the reading of clock 109 and the reading of clock 113, defined as $\Delta_2$.

The detector 115 now determines whether $delay_2$ substantially equals $delay_1$. It does this by computing the absolute value of the difference between these two Δ's ($\Delta_1$ minus $\Delta_2$) and then comparing this absolute value to a predetermined number or threshold, which may be defined as K. It will be appreciated that K may be selected based on the $drift_1$ and the $stability_1$ of the first clock 109, the $drift_2$ and the $stability_2$ of the second clock 113, $delay_1$, and the set or range of allowable or permissible variations in $delay_1$. If the delay 102 has not substantially changed, then $delay_2$ will substantially equal $delay_1$, and the absolute value of $\Delta_1$ minus $\Delta_2$ will be equal to or less than K. Conversely, if the delay 102 has substantially changed, then $delay_2$ will not substantially equal $delay_1$, and the absolute value of $\Delta_1$ minus $\Delta_2$ will be greater than K.

Figure 2:
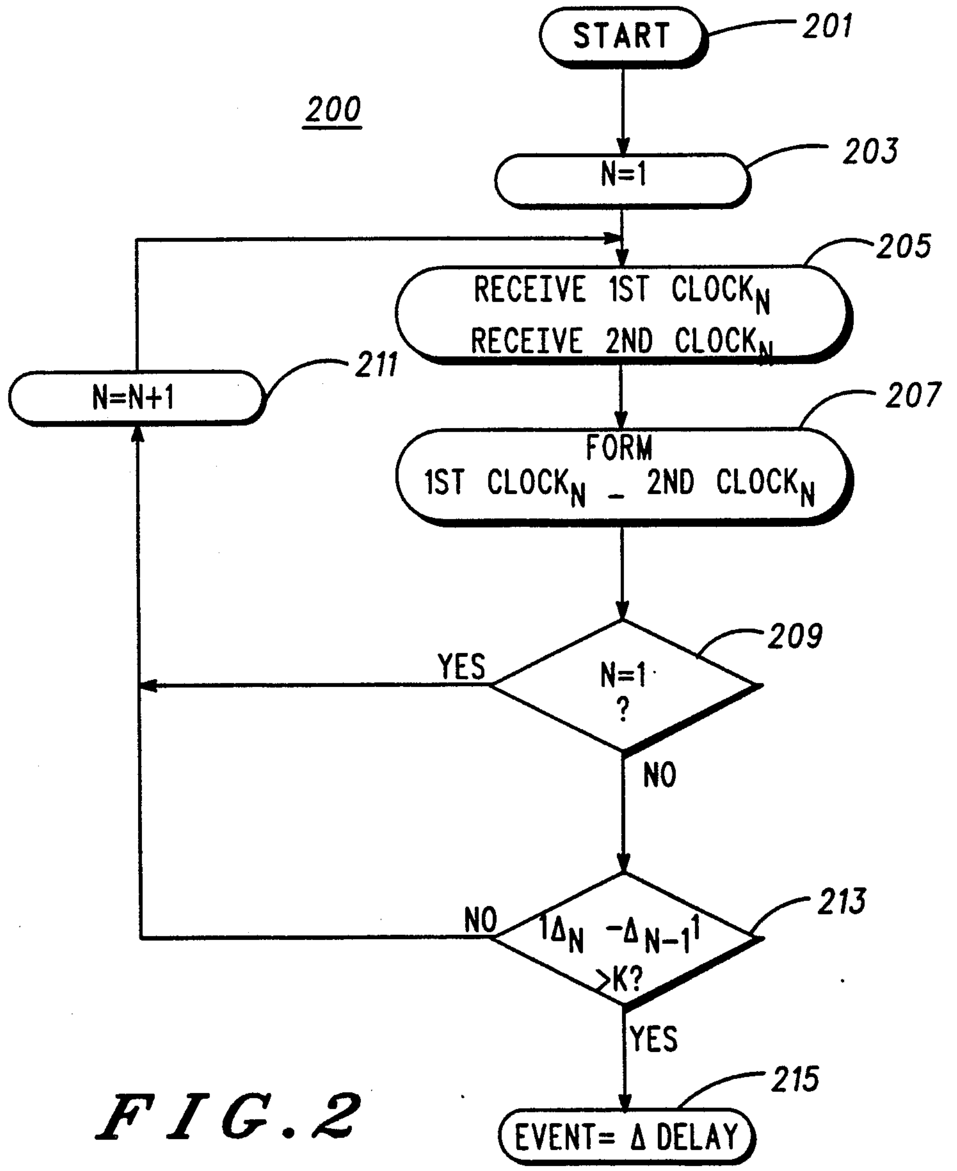
FIG. 2 is a flow diagram for the first embodiment.

Referring now to FIG. 2 there is shown a flow diagram 200 for the first embodiment. After starting at step 201, the process sets n=1, step 203. The process then goes to step 205, where it receives the current, or nth, first clock reading (first $clock_n$) and the related nth second clock reading (second $clock_n$). The process then goes to step 207, where it forms the current, or nth, difference ($\Delta_n$) between the clock readings by computing $\Delta_n$=first $clock_n$−second $clock_n$ step 207.

The process then determines whether a prior difference $\Delta_{n-1}$ has been calculated or exists. This is equivalent to determining whether n=1, step 209.

If the answer to this determination (step 209) is affirmative, then a prior difference $\Delta_{n-1}$ has not been calculated yet, and the process goes to step 211, where it increments n by forming n=n+1. The process then continues with step 205.

If the answer to this determination (step 209) is negative, then a prior difference $\Delta_{n-1}$ already has been calculated or exists, and the process goes to step 213, where it determines whether the absolute value of $\Delta_n-\Delta_{n-1}$ is greater than a predetermined constant, K.

If the answer to this determination step (213) is negative, then $delay_2$ is substantially equal to $delay_1$, and the process goes to step 211 where it increments n. The process then continues with step 205.

If the answer to this determination step (213) is affirmative, then the process determines that $delay_2$ is not substantially equal to $delay_1$, step 215.

Figure 3:
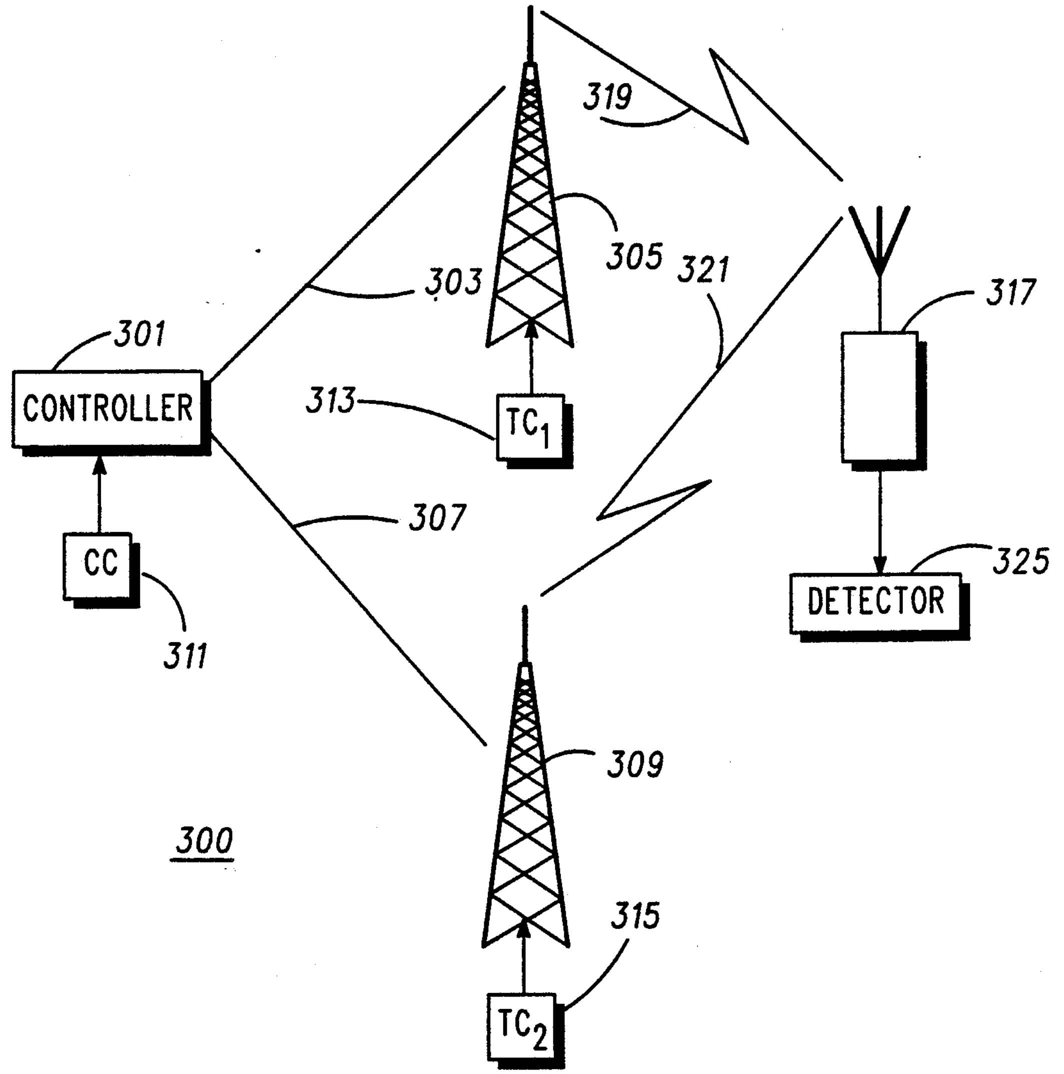
FIG. 3 is a block diagram showing a typical application for the first embodiment.

FIG. 3 is a block diagram showing a typical system application for the first embodiment. There is shown a simulcast system 300 comprising a system controller 301 coupled to a first transmitter 305 via a first facility 303 and coupled to a second transmitter 309 via a second facility 307. It is assumed that the first facility 303 includes $delay_A$ and the second facility 307 includes $delay_B$.

It is assumed that both facilities 303 and 307 are susceptible to change due to aging, environmental effects, or telephone company procedures and, therefore, their respective delays—$delay_A$ and $delay_B$—are subject to change. For this reason, it is desirable to determine, from time to time, whether $delay_A$ has changed, whether $delay_B$ has changed, or whether both $delay_A$ and $delay_B$ have changed.

We will first consider the process of determining, from time to time, whether $delay_A$ has changed. System controller 301 is coupled to controller clock (CC) 311 and arranged to transmit the CC signal from time to time to transmitter 305 via facility 303. The facility 303, it will be recalled, includes $delay_A$. Transmitter 305, in turn, is coupled to transmitter clock 1 (TC1) 313 and arranged to generate and transmit a TC1 signal upon receipt of a CC signal. Receiver 317 is arranged to receive via communication path 319 the periodic CC and TC1 signals sent from transmitter 305. These signals are then coupled to a detector 325 by any convenient means such as, for instance, a telephone line. It will be appreciated that detector 325 may be arranged consistent with the present invention to analyze the CC and TC1 signals as received from time to time in order to detect when $delay_A$ has changed.

We will next consider the process of determining, from time to time, whether $delay_B$ has changed. System controller 301, it will be recalled, is coupled to clock CC (311). System controller 301 transmits the CC signal from time to time to transmitter 309 via facility 307. The facility 307, it will be recalled, includes $delay_B$. Transmitter 309, in turn, is coupled to clock TC2 (315) and arranged to generate and transmit a TC2 signal upon receipt of a CC signal. The receiver 317 is further arranged to receive via communication path 321 the periodic CC and TC2 signals sent from transmitter 309. These signals are then coupled to the detector 325. It will be appreciated that detector 325 may be arranged consistent with the present invention to analyze the CC and TC2 signals as received from time to time in order to detect when $delay_B$ has changed.

It will be appreciated that controller 301's application of (or impressing) the CC signal to one facility (either 303 or 307) may be independent of controller 301's application of (or impressing) the CC signal to the other facility (either 307 or 303). This is a design choice, and may vary according to the application.

For example, in one application controller 301 may apply the CC signal to facilities 303 and 307 generally at the same time, or simultaneously. In this case, as viewed by the controller 301, the departing CC signals would be inphase or "in sync" with respect to one another.

Conversely, in another application controller 301 may apply the CC signal to facilities 303 and 307 at different times. With this arrangement, controller 301 may apply the CC signal to one facility (either 303 or 307) at a first time and to the other facility (either 307 or 303) at a second time. In this case, as viewed by the controller 301, the departing CC signals would be out-of-phase or "out of sync" with respect to one another.

It will be appreciated that the controller 301 may transmit the CC signal on a periodic basis with fixed frequency. On the other hand, the controller 301 may transmit the CC signal at the time that control messages are sent to each transmitter, for example, key up dekey, diagnostic polling, etc.

A typical system application would be one for maintaining equalization between simulcast transmitters in a binary paging system. The newest paging systems presently available utilize a 1200 baud POCSAG paging format. These systems generally try to hold all phase delay variation to less than a quarter (¼) bit time, in this case 208 microseconds (μsec). Automatic equalization systems for these paging networks are generally capable of measuring and adjusting phase delay between transmitters to within 1 to 10 microseconds (μsec), and so only changes in delay much larger than this (1-10 μsec) need to be detected and corrected.

Each simulcast paging transmitter is typically equipped with a high stability oscillator (HSO). A typical HSO will have a stability of 0.3 parts per billion per hour maximum drift, and 30 parts per billion drift per degree Centrigrade change in temperature. The maximum drift in an hour for a clock based on this oscillator would be: $0.3\times60\times60=1080$ ppb of an hour or 1.08 microseconds (μsec). The drift caused by a change over a typical specified temperature range of $-30$ degrees C. to $+60$ degrees C. is: $30\times90=2700$ ppb of an hour or 2.7 microseconds (μsec). Assuming both drifts for both the controller CC oscillator and the transmitter TC oscillator are at their worst-case maximum and the two oscillators drift in opposite directions the maximum difference in an hour interval is: $(1.08+2.7)\times2=7.56$ microseconds (μsec)=K. This change is on the order of the accuracy that can be achieved by the delay adjustment process and is small relative to the 208 microsecond budget for delay differences.

Although FIG. 3 depicts detector 325 used as a common detector to determine delay changes in multiple facilities 303 and 307, it will be appreciated that other arrangements are also possible. For instance, each transmitter (such as 305 and 309 in FIG. 3) may be equipped with its own detector (not shown in FIG. 3) dedicated to determining delay changes in the facility serving that transmitter. With this arrangement, each determine delay changes in only one facility.

While various embodiments of the delay equalization detector, according to the invention, have been disclosed herein, the scope of the invention is defined by the following claims.

What is claimed is:

1. In a communication system (100) comprising a transmitter (107) coupled to a receiver (111) via a channel (101) having a time delay (102) whose value may change, the transmitter (107) having a transmitter clock (109) and arranged to periodically send a transmitter signal including the transmitter clock (109)'s current reading to the receiver (111) via the channel (101), the receiver (111) having a receiver clock (113) and arranged to send a receiver signal including the receiver clock (113)'s current reading upon the transmitter signal arriving at the receiver (111), and a detector (115) coupled to the receiver (111) and arranged for recovering the transmitter signal and the transmitter clock (109) reading included therewith, and further arranged for recovering the receiver signal and the receiver clock (113) reading included therewith, a method for the detector (115) determining when the time delay (102) has changed, comprising the steps of:

at the detector (115):

(a) recovering a transmitter signal$_n$ and the transmitter clock reading$_n$ included therewith;

(b) recovering a receiver signal$_n$ and the receiver clock reading$_n$ included therewith;

(c) calculating $\Delta_n$ equal to the transmitter clock reading$_n$ minus the receiver clock reading$_n$;

(d) recovering a transmitter signal$_{n+1}$ and the transmitter clock reading$_{n+1}$ included therewith;

(e) recovering a receiver signal$_{n+1}$ and the receiver clock reading$_{n+1}$ included therewith;

(f) calculating $\Delta_{n+1}$ equal to the transmitter clock reading$_{n+1}$ minus the receiver clock reading$_{n+1}$;

(g) calculating the absolute value of $\Delta_n$ minus $\Delta_{n+1}$; and, (h) determining when the time delay has changed by comparing the value calculated in step (g) with a predetermined value ("K"), where n is a non-zero positive integer such as, for example, 1, 2, 3, 4, 5, . . . , and so forth.

2. The method of claim 1, where K is based on the transmitter clock and the receiver clock.

3. The method of claim 2, where K is based on the drift and stability of the transmitter clock and the drift and stability of the receiver clock.

4. The method of claim 1, wherein the detector and the receiver are located at the same site.

5. The method of claim 1, wherein the detector and the receiver are located at different sites.

6. The method of claim 1, where the communication system comprises a simulcast system.

7. In a simulcast system (300) comprising a controller (301) coupled to a transmitter (305) via a channel (303) having a time delay whose value may change, the controller (301) having a controller clock (311) and arranged to periodically send a controller signal including the controller clock's current reading to the transmitter via the channel, the transmitter having a transmitter clock (313) and arranged to send a transmitter signal including the transmitter clock's current reading upon the controller signal arriving at the transmitter, and a detector (325) coupled to the transmitter and arranged for recovering the controller signal and the controller clock reading included therewith, and further arranged for recovering the transmitter signal and the transmitter clock reading included therewith, a method for the detector determining when the time delay has changed, comprising the steps of:

at the detector:

(a) recovering a controller signal$_n$ and the controller clock reading$_n$ included therewith;

(b) recovering a transmitter signal$_n$ and the transmitter clock reading$_n$ included therewith;

(c) calculating $\Delta_n$ equal to the controller clock reading$_n$ minus the transmitter clock reading$_n$;

(d) recovering a controller signal$_{n+1}$ and the controller clock reading$_{n+1}$ included therewith;

(e) recovering a transmitter $signal_{n+1}$ and the transmitter clock $reading_{n+1}$ included therewith;

(f) calculating $\Delta_{n+1}$ equal to the controller clock $reading_{n+1}$ minus the transmitter clock $reading_{n+1}$;

(g) calculating the absolute value of $\Delta_n$ minus $\Delta_{n+1}$; and, (h) determining when the time delay has changed by comparing the value calculated in step (g) with a predetermined value ("K"), where n is a non-zero positive integer such as, for example, 1, 2, 3, 4, 5, . . . , and so forth.

8. The method of claim 7, where K is based on the controller clock and the transmitter clock.

9. The method of claim 8, where K is based on the drift and stability of the controller clock and the drift and stability of the transmitter clock.

10. The method of claim 7, wherein the detector and the transmitter are located at the same site.

11. The method of claim 7, wherein the detector and the transmitter are located at different sites.

* * * * *

UNITED STATES PATENT AND TRADEMARK OFFICE

CERTIFICATE OF CORRECTION

PATENT NO. : 5,105,439

DATED : April 14, 1992

INVENTOR(S) : Richard L. Bennett and Venkat Narayanan

It is certified that error appears in the above-identified patent and that said Letters Patent is hereby corrected as shown below:

Abstract: Line 17, "n + a" should be --n + 1--.

In Fig. 2, element 213 incorrectly shows the expression:

$$1\Delta_N - \Delta_{N-1}1$$

The correct expression, should reflect the absolute value of the enclosed term as follows:

$$|\Delta_N - \Delta_{N-1}|$$

Signed and Sealed this

Fifth Day of October, 1993

Attest:

BRUCE LEHMAN

*Attesting Officer*

*Commissioner of Patents and Trademarks*